United States Patent
Goel et al.

(10) Patent No.: US 12,059,977 B2
(45) Date of Patent: Aug. 13, 2024

(54) METHODS AND SYSTEMS FOR ACTIVATING A DOOR LOCK IN A VEHICLE

(71) Applicant: HL Klemove Corp., Pyeongtaek (KR)

(72) Inventors: Manish Goel, Uttar Pradesh (IN); Gaurav Sharma, Haryana (IN); Alok Miglani, New Delhi (IN)

(73) Assignee: HL KLEMOVE CORP., Incheon (KR)

( * ) Notice: Subject to any disclaimer, the term of this patent is extended or adjusted under 35 U.S.C. 154(b) by 431 days.

(21) Appl. No.: 17/533,052

(22) Filed: Nov. 22, 2021

(65) Prior Publication Data

US 2022/0161688 A1  May 26, 2022

(30) Foreign Application Priority Data

Nov. 23, 2020  (IN) .............................. 202011050969

(51) Int. Cl.
   *B60N 2/00* (2006.01)
   *B60R 21/015* (2006.01)
   *E05B 81/62* (2014.01)

(52) U.S. Cl.
   CPC ........ *B60N 2/002* (2013.01); *B60R 21/01516* (2014.10); *B60R 21/01538* (2014.10); *E05B 81/62* (2013.01)

(58) Field of Classification Search
   CPC .............. B60N 2/002; B60R 21/01516; B60R 21/01538; E05B 81/62
   USPC .......................................................... 701/45
   See application file for complete search history.

(56) References Cited

U.S. PATENT DOCUMENTS

| | | | |
|---|---|---|---|
| 9,446,730 B1* | 9/2016 | Chen | H04N 7/188 |
| 9,998,697 B2* | 6/2018 | Frank | G06V 40/10 |
| 10,643,085 B1* | 5/2020 | Kim | G06V 20/593 |
| 10,829,072 B2* | 11/2020 | Miller | G06V 20/59 |
| 11,048,973 B1* | 6/2021 | Ramanathan | G06V 10/774 |
| 11,548,427 B1* | 1/2023 | Shanmuga Sundaram | B62D 25/20 |
| 11,933,660 B2* | 3/2024 | Aina | G01V 9/00 |
| 2006/0025897 A1 | 2/2006 | Shostak | |
| 2007/0086624 A1 | 4/2007 | Breed | |
| 2010/0182425 A1* | 7/2010 | Sakakida | B60N 2/002 348/135 |

(Continued)

FOREIGN PATENT DOCUMENTS

CN  110909597 A  3/2020

OTHER PUBLICATIONS

Henrik Hallberg et al., Detection of child-like objects inside vehicles using deep learning, 2018 Chalmers University of Technology, pp. 1-95 (pdf).*

(Continued)

*Primary Examiner* — Manglesh M Patel
(74) *Attorney, Agent, or Firm* — Harvest IP Law, LLP (57) ABSTRACT

A method for activating a lock in a vehicle includes capturing an image of an interior of a vehicle, the image comprising an occupant on a seat of the vehicle, detecting a weight value of the occupant on a respective seat of the vehicle, processing the image for determining whether the occupant is a human or an object or an animal, processing, in response to the determination that the occupant is the human, the image for determining a parameter of the human, and activating a lock based on the parameter, or the weight value and the parameter.

19 Claims, 6 Drawing Sheets

(56) References Cited

U.S. PATENT DOCUMENTS

| | | | | |
|---|---|---|---|---|
| 2012/0069050 | A1* | 3/2012 | Park | G06F 16/434 |
| | | | | 345/632 |
| 2013/0314536 | A1* | 11/2013 | Frank | B60H 1/00742 |
| | | | | 348/148 |
| 2016/0177614 | A1* | 6/2016 | Wacker | E05F 15/73 |
| | | | | 340/5.82 |
| 2017/0088098 | A1* | 3/2017 | Frank | H04N 5/33 |
| 2018/0065582 | A1* | 3/2018 | Miller | B60R 21/01552 |
| 2018/0079322 | A1* | 3/2018 | Tanriover | B60N 2/0244 |
| 2018/0150707 | A1* | 5/2018 | Fujii | G06T 7/70 |
| 2018/0236975 | A1* | 8/2018 | Myers | G06V 40/193 |
| 2019/0023207 | A1* | 1/2019 | Lambermont | B60Q 9/00 |
| 2019/0359169 | A1* | 11/2019 | Schutera | B60R 21/01538 |
| 2020/0094771 | A1* | 3/2020 | Jost | B60R 21/207 |
| 2020/0171977 | A1* | 6/2020 | Jales Costa | B60N 2/002 |
| 2021/0149397 | A1* | 5/2021 | Shin | G06V 20/56 |
| 2021/0188205 | A1* | 6/2021 | Adusumalli | G06V 10/25 |
| 2021/0300274 | A1* | 9/2021 | Manawadu | B60R 21/16 |
| 2021/0366273 | A1* | 11/2021 | Pan | G08G 1/0145 |
| 2022/0062752 | A1* | 3/2022 | Zeng | G06F 3/013 |
| 2022/0246019 | A1* | 8/2022 | Millsapp | G08B 21/0277 |
| 2022/0256123 | A1* | 8/2022 | Parenti | B60H 1/00871 |
| 2022/0306027 | A1* | 9/2022 | Lee | B60R 21/01512 |
| 2022/0388527 | A1* | 12/2022 | Barth | G06V 10/82 |
| 2022/0405573 | A1* | 12/2022 | Bhaskar | H04L 67/34 |
| 2023/0057766 | A1* | 2/2023 | Salter | E05F 15/71 |
| 2023/0182671 | A1* | 6/2023 | Oya | E05F 15/43 |
| | | | | 382/104 |
| 2023/0205205 | A1* | 6/2023 | Potnis | B60W 60/0051 |
| | | | | 701/23 |
| 2023/0322173 | A1* | 10/2023 | Park | G06V 10/82 |
| | | | | 701/36 |
| 2024/0013419 | A1* | 1/2024 | Friedrichs | G06V 10/96 |
| 2024/0029452 | A1* | 1/2024 | Cho | G06V 40/10 |

OTHER PUBLICATIONS

Malneedi Vamsi et al., In-Vehicle Occupancy Detection And Classification Using Machine Learning, 2020, IEEE, pp. 1-6 (pdf).*

* cited by examiner

METHODS AND SYSTEMS FOR ACTIVATING A DOOR LOCK IN A VEHICLE

CROSS-REFERENCE TO RELATED APPLICATION

This application claims priority to and the benefit of India Patent Application No. 202011050969, filed on Nov. 23, 2020, the disclosure of which is incorporated herein by reference in its entirety.

TECHNICAL FIELD

The present disclosure generally relates to the field of automobiles. More particularly, the present disclosure describes a technique for activating at least one lock in a vehicle.

BACKGROUND

A child lock in a vehicle is used to deactivate mechanicals of an interior door handle of the vehicle. The child lock prevents the door from accidently being opened when the vehicle is in motion. When the child lock is engaged, the door cannot be opened from the inside of the vehicle. The only way to open the door would be from the outside of the vehicle.

In a scenario where a parent is driving the vehicle and a child is sitting on the rear seat and the child lock is engaged, even if the child tries to pull the door handle from the inside the door will not open. Once the destination is reached, the child lock can be deactivated by the parent from outside of the vehicle.

Presently, child lock in vehicle is accessible to the driver of the vehicle and is manually operated by the driver in case a child is sitting on the rear seat of the vehicle. However, there may be a situation when the driver of the vehicle forgets to activate the child lock. In such a situation, the child may unlock the door by simply pulling the interior door handle of the vehicle, which may lead to an accident.

Thus, there exists a need in the art to detect a presence of child in the vehicle and automatically activate the child lock if a child is present, which may help in preventing an accident.

SUMMARY

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one non-limiting embodiment of the present disclosure, an automatic door lock system for a vehicle is disclosed. The automatic door lock system comprises a lock and an image sensor configured to capture the image of an interior of the vehicle. The image comprising an occupant on a seat of the vehicle. The automatic door lock system comprises a weight sensor. Each weight sensor is arranged in a respective seat of the vehicle and configured to detect a weight value of the occupant on the respective seat of the vehicle. The automatic door lock system further comprises a processor operatively coupled with the image sensor, the weight sensor and the lock and configured to receive the image and process the image to determine whether the occupant is a human or an object or an animal.

In still non-limiting embodiment of the present disclosure, in response to the determination that the occupant is the human, the processor is configured to receive the weight value from the weight sensor, process the received image to determine a parameter of the human, and activate the lock based on the parameter, or the weight value and the parameter.

In yet another non-limiting embodiment of the present disclosure, the parameter of the human is selected from a group comprising an age and a height. If the occupant comprises only the human, the processor is configured to activate the lock in response to either one of the age of the human is less than a first threshold, or the height of the human is less than a second threshold and the detected weight value of the corresponding human is less than a third threshold.

In yet another non-limiting embodiment of the present disclosure, if the occupant comprises the human and the object, the processor is configured to activate the lock in response to either one of the age of the human is less than the first threshold, or the height of the human is less than the second threshold. If the occupant comprises the human and the animal, the processor is configured to activate the lock in response to either one of the age of the human is less than the first threshold, or the height of the human is less than the second threshold.

In yet another non-limiting embodiment of the present disclosure, if the occupant comprises the human, the animal, and the object, the processor is configured to activate the lock in response to either one of the age of the human is less than the first threshold, or the height of the human is less than the second threshold.

In yet another non-limiting embodiment of the present disclosure, to determine the age of the human, the processor is configured to detect a face of the human in the image, in response to detection of the face of the human, calculate a distance between left eye pupil and right eye pupil in each of the detected face, and determine the age of the human based on the calculated distance in the corresponding detected face.

In yet another non-limiting embodiment of the present disclosure, to determine the age of the human, the processor is configured to detect a face of the human in the image, in response to detection of the face of the human, calculate a nose length in each of the detected face, and determine the age of the human based on the calculated nose length in the corresponding detected face.

In yet another non-limiting embodiment of the present disclosure, to determine the height of the human, the processor is configured to determine the height of the human based on a reference parameter, said parameter comprising a height of a back rest of the seat or a horizontal distance between doors of the vehicle.

In yet another non-limiting embodiment of the present disclosure, the automatic door lock system further comprises a human-machine interface (HMI) operatively coupled to the processor and configured to receive an HMI input from a user and in response to the HMI input, the processor is configured to activate/deactivate the lock.

In yet another non-limiting embodiment of the present disclosure, a method for activating a lock in a vehicle is disclosed. The method comprises steps of capturing an image of an interior of the vehicle, the image comprising an occupant on a seat of the vehicle, detecting a weight value of the occupant on a respective seat of the vehicle, and processing the image for determining whether the occupant is a human or an object or an animal.

In yet another non-limiting embodiment of the present disclosure, in response to the determination that the occupant is a human, the method further comprises the step of processing the image for determining a parameter of the human, and activating the lock based on the parameter, or the weight value and the parameter.

In yet another non-limiting embodiment of the present disclosure, a non-transitory computer-readable medium is disclosed. The non-transitory computer-readable medium having computer-readable instructions that when executed by a processor causes the processor to perform operations of capturing an image of an interior of the vehicle, the image comprising an occupant on a seat of the vehicle, detecting a weight value of the occupant on a respective seat of the vehicle, processing the image for determining whether the occupant is a human or an object or an animal, in response to the determination that the occupant is the human, processing the image for determining a parameter of the human, and activating the lock based on the parameter, or the weight value and the parameter.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The features, nature, and advantages of the present disclosure will become more apparent from the detailed description set forth below when taken conjunction with the drawings in which like reference characters identify correspondingly throughout. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams and the like represent various processes which may be substantially represented in computer readable medium and executed by a computer or processor, whether or not such computer or processor is explicitly shown.

DETAILED DESCRIPTION OF THE EMBODIMENTS

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", "include(s)", or any other variations thereof, are intended to cover a non-exclusive inclusion, such that a setup, system or method that comprises a list of components or steps does not include only those components or steps but may include other components or steps not expressly listed or inherent to such setup or system or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
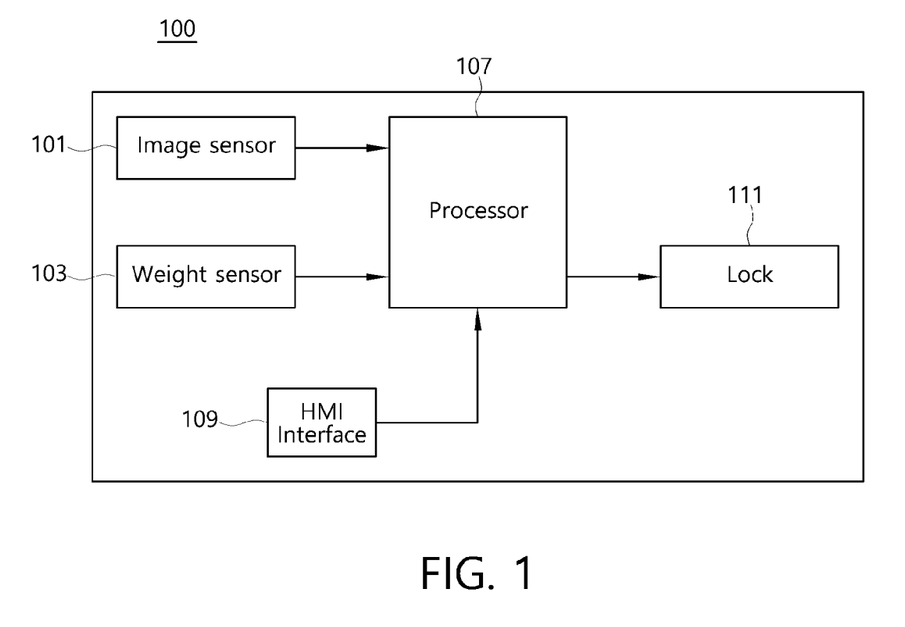
FIG. 1 shows a block diagram illustrating an automatic door lock system for a vehicle, in accordance with an embodiment of the present disclosure.

FIG. 1 shows a block diagram illustrating an automatic door lock system 100 for a vehicle, in accordance with an embodiment of the present disclosure.

In this embodiment of the present disclosure, an automatic door lock system 100 is disclosed. The automatic door lock system 100 may comprise at least one image sensor 101, at least one weight sensor 103, a processor 107, a human machine interface (HMI) 109, and at least one lock 111. Each of the at least one lock 111 may lock/unlock a respective door of the vehicle. The image sensor 101 may capture at least one image of an interior of the vehicle. The image may comprise at least one occupant on at least one seat of the vehicle. The at least one occupant may be a human or an object or an animal. The image sensor 101 may comprise at least one camera located at appropriate location (s), known to a person skilled in the art, inside the vehicle to capture at least one image of an interior of the vehicle. In a non-limiting example of this embodiment, the image sensor 101 may comprise at least one camera installed at the inner roof of the vehicle to capture the image of at least one rear seat of the vehicle. In this example, the image may comprise at least one occupant on at least one rear seat of the vehicle. In another non-limiting example of this embodiment, the capturing of image is not limited to rear seat of the vehicle and the capturing of image may comprise capturing an image of the occupant at the front seat of the vehicle.

In this embodiment of the present disclosure, the at least one weight sensor 103 may be arranged in a respective seat of the vehicle. The weight sensor 103 may detect a weight value of the occupant on the respective seat of the vehicle. In a non-limiting example of this embodiment, the weight sensor 103 may comprise a hydro static weight sensor. The weight sensor 103 may comprise any other appropriate sensor capable of detecting weight, that is, known to a person skilled in the art.

In this embodiment of the present disclosure, the processor 107 may be operatively coupled to the at least one image sensor 101. The processor 107 may be configured to receive at least one image from the image sensor 101 and process the received at least one image to determine whether the occupant is a human or an object or an animal. In an example of this embodiment, the image sensor 101 may be activated to capture one or more images of an interior of the vehicle in response to the ignition of the vehicle being turned ON. In another example of this embodiment, the image sensor 101 may be activated to capture one or more images of an interior of the vehicle in response to the ignition of the vehicle being turned ON and closing action of door of the vehicle. In a non-limiting example of this embodiment, the image sensor 101 may be activated to capture one or more images of an interior of the vehicle in response to the ignition of the vehicle being turned ON and closing action of rear door of the vehicle.

The processor 107 may be trained to differentiate between different types of occupants. For example, the processor 107 may be trained to classify the occupant as a human or an object or an animal by processing the at least one image received from the at least one image sensor 101. In this embodiment, the processor 107 may be trained using a plurality of images of different types of occupants. In an example of this embodiment, the training images may be images of a human sitting on the seat, images of a human inclined/relaxing on the seat, images of a human sleeping on the seat, images of a human sitting on the seat holding an object or animal, etc. In another example of this embodiment, the training images may be images of various types of objects that can be accommodated in the vehicle. In yet another example of this embodiment, the training images may be images of animals that can be accommodated in the vehicle. In a further example of this embodiment, the training images may be images of humans and objects or humans and animals or objects and animals or humans and objects and animals. In this embodiment, the processor 107 may be trained using images of rears seats of the vehicle to classify the occupants on the rear seats of the vehicle. Based on the training, the processor 107 may determine whether the occupant is a human or an object or an animal.

In this embodiment of the present disclosure, the processor 107 may be configured to receive the at least one image from the at least one image sensor 101. The processor 107 may then be configured to process the received at least one image to determine whether the occupant is a human or an object or an animal.

In this embodiment of the present disclosure, the processor 107 may be operatively coupled to the at least one weight sensor 103 and at least one lock 111. If the classification of the occupant indicates only the object or only the animal or a combination of the object and the animal, the processor 107 may be configured to not take any action and terminate the process. On the other hand, if the classification of the occupant is the human, the processor 107 may be configured to process the received at least one image for determining at least one parameter of the human. In this embodiment of the present disclosure, the processor 107 may be an electronic control unit that may comprise a partial network (PN) transceiver.

In this embodiment of the present disclosure, the at least one parameter of the human may comprise an age of the human and a height of the human. To determine the age of the human, the processor 107 may be configured to detect a face of the human in the at least one image. In response to the detection of the face of the human in the at least one image, the processor 107 may calculate a distance between left eye pupil and right eye pupil in each of the detected face to determine the age of the human based on the calculated distance in the corresponding detected face. The distance between left eye pupil and right eye pupil may be mapped to a respective age value in a memory of the processor 107. The mapping of distance between left eye pupil and right eye pupil with age value may vary based on the geographical region, where the vehicle is being driven.

In this embodiment of the present disclosure, to determine the age of the human, the processor 107 may also be configured to detect the face of the human in the image. In response to detection of the face of the human in the image, the processor 107 may be configured to calculate a nose length in each of the detected face to determine the age of the human based on the calculated nose length in the corresponding detected face. The nose length may be mapped to a respective age value in a memory of the processor 107. The mapping of calculated nose length with the age value may vary based on the geographical region, where the vehicle is being driven. It is to be noted that the present disclosure is not limited to the above defined techniques of age determination. In one non-limiting embodiment of the present disclosure, corners and edges of the eyes, lips and nostrils may be features used for mapping. However, determination of age through these features is purely dependent on the image processing technique used. Any other age determination method which uses image processing technique is well within the scope of the present disclosure.

Figure 3A:
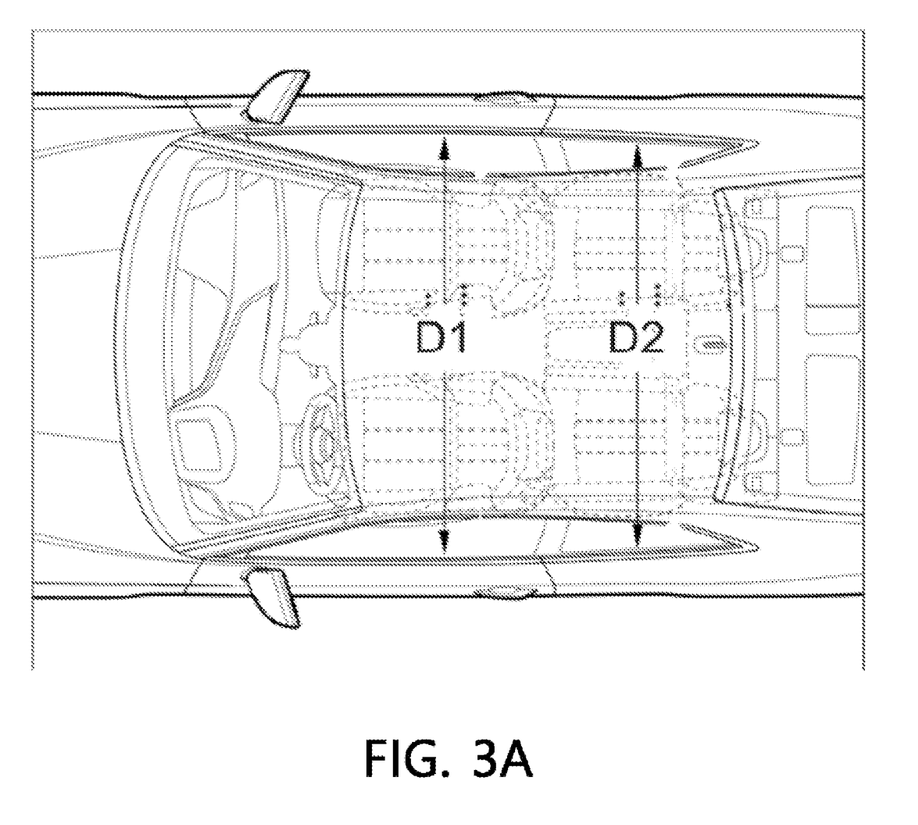
FIG. 3(a) illustrates a top interior view of a vehicle, in accordance with an embodiment of the present disclosure.
Figure 3B:
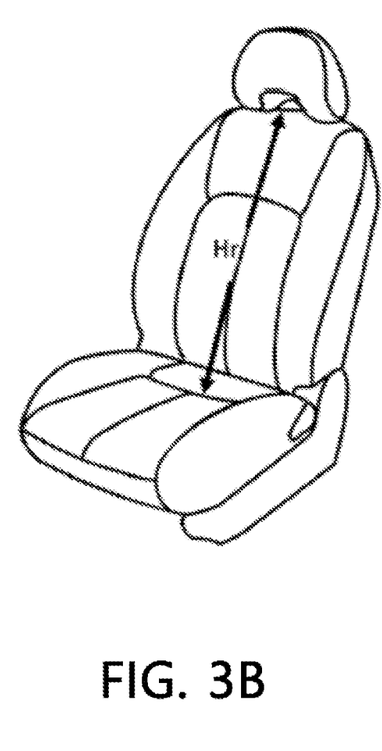
FIG. 3(b) illustrates an occupant seat of a vehicle, in accordance with an embodiment of the present disclosure.

In this embodiment of the present disclosure, the height of the human may be determined in the following manner. If the image indicates the human in a sitting position, the processor 107 may be configured to determine the height of the human based on at least one reference parameter. The reference parameter may comprise a height of a back rest of the seat of the vehicle. As shown in FIG. 3(*b*), the height of a back rest of the seat of the vehicle may be denoted by $H_r$. If the image indicates the human in a sleeping position, the reference parameter may comprise a horizontal distance between doors of the vehicle. As shown in FIG. 3(*a*), the horizontal distance between front and rear doors of the vehicle may be denoted by D1 and D2, respectively.

In an embodiment of the present disclosure, a height of the back rest of the seat of the vehicle and coordinates of the back rest of the seat of the vehicle are stored in the memory. When the human is in sitting position, the processor 107 is configured to determine the coordinates of the waist and head of the human from the image and compare the determined coordinates of the waist and head with the coordinates of the back rest of the seat of the vehicle to calculate the height of the human. In another embodiment of the present disclosure, the horizontal distance between front and rear doors of the vehicle and coordinates of the doors are stored in the memory. When the human is in sleeping position, the processor 107 is configured to determine the coordinates of the waist and head of the human from the image and compare the determined coordinates of the waist and head with the coordinates of the respective doors to calculate the height of the human. It is to be noted that the present disclosure is not limited to the above defined techniques of height determination. Any other height determination method which uses image processing technique is well within the scope of the present disclosure.

In this embodiment of the present disclosure, the processor 107 may be configured to activate the at least one lock 111 based on the at least one parameter, or based on the at least one weight value and at the at least one parameter. The at least one parameter and the at least one weight value may be used to determine a presence of a child inside the vehicle. For example, if the occupant comprises only the human, the processor 107 may be configured to detect a presence of the child in response to either one of the age of the human being less than a first threshold, or the height of the human being less than a second threshold and the detected weight value of the corresponding human being less than a third threshold. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold and the detected weight value of the corresponding human is less than the third threshold. The processor 107 may be configured to activate the at least one lock 111 if the child is detected.

In this embodiment of the present disclosure, if the occupant comprises the human and the object, the processor 107 may be configured to detect a presence of a child in response to either one of the age of the human being less than the first threshold, or the height of the human being less than the second threshold. In such cases, where the human is detected along with the object, the detected weight value is ignored, as the detected weight value may become greater than the third threshold due to the weight of the object. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold.

Similarly, if the occupant comprises the human and the animal, the processor 107 may be configured to detect a presence of a child in response to either one of the age of the human being less than the first threshold, or the height of the human being less than the second threshold. In a scenario where the human is detected along with the animal, the detected weight value is ignored, as the detected weight value may become greater than the third threshold due to the weight of the animal. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold. The processor 107 may be configured to activate the at least one lock 111 if the child is detected.

In this embodiment of the present disclosure, if the occupant comprises a human, an animal, and an object, the processor 107 may be configured to detect a presence of a child in response to either one of the age of the human being less than the first threshold, or the height of the human is less than the second threshold. In a scenario where a human is detected along with the object and the animal, the detected weight value is ignored, as the detected weight value may become greater than the third threshold due to the weight of the object and the animal. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold. The processor 107 may be configured to activate the at least one lock 111 if the child is detected.

In this embodiment of the present disclosure, the first threshold may be selected by the user of the vehicle. The second threshold and the third threshold may vary based on the various geographical regions of the world, where the vehicle is being driven. In another embodiment of the present disclosure, the first threshold, second threshold and the third threshold may be varied as per selection by the user of the vehicle. In one non-limiting embodiment of the present disclosure, the first threshold may be 3 years, the second threshold may be 88.9 centimeters, and the third threshold may be 11.8 kilograms for India.

In an embodiment of the present disclosure, the automatic door lock system 100 may also comprise a human-machine interface (HMI) 109 operatively coupled to the processor 107 and configured to receive an HMI input from a user/driver of the vehicle. The processor 107 may be configured to activate/deactivate the at least one lock 111 based on the HMI input. The HMI may be used by the user to manually activate or deactivate the at least one lock 111 of the vehicle.

Figure 2:
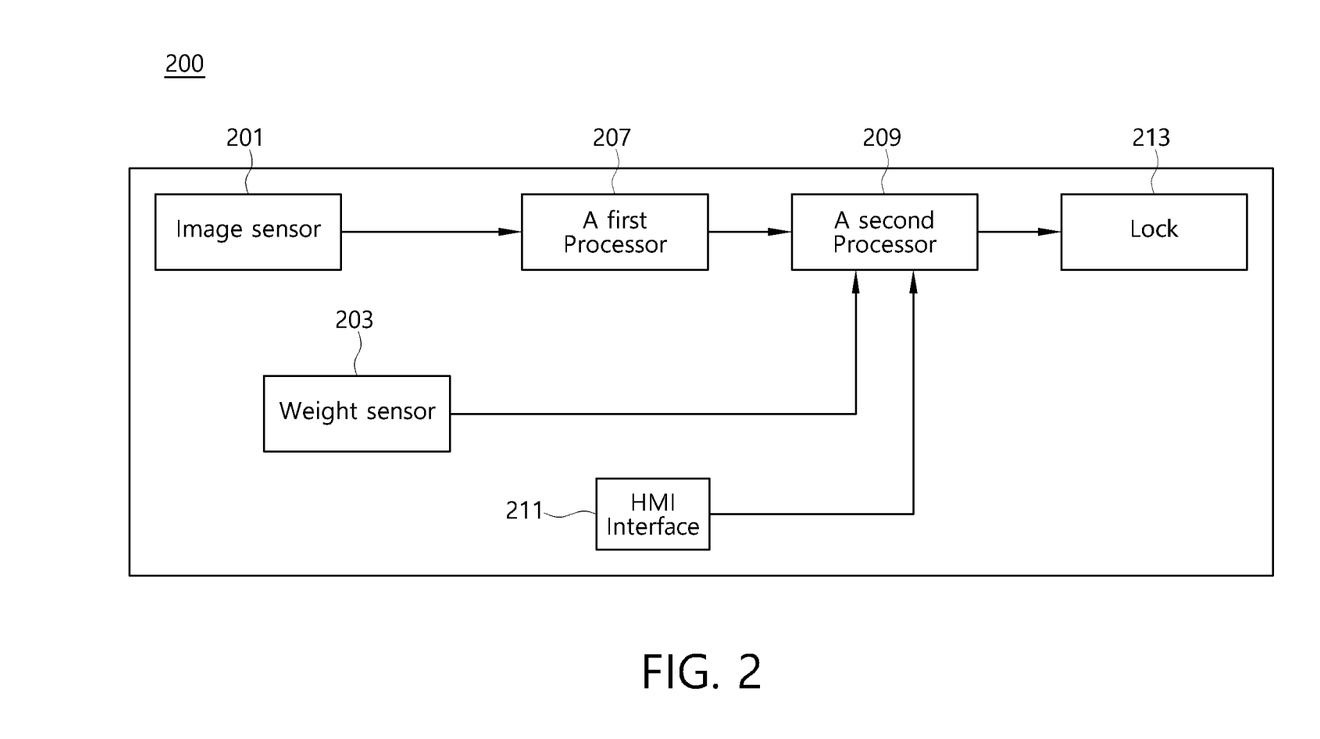
FIG. 2 shows a block diagram illustrating an automatic door lock system for a vehicle, in accordance with another embodiment of the present disclosure.

FIG. 2 shows a block diagram illustrating an automatic door lock system 200 for a vehicle, in accordance with another embodiment of the present disclosure.

In an embodiment of the present disclosure, an automatic door lock system 200 is disclosed. The automatic door lock system 200 may comprise at least one image sensor 201, at least one weight sensor 203, a first processor 207, a second processor 209, human machine interface (HMI) 211, and at least one lock 213. Each of the at least one lock 213 may lock/unlock a respective door of the vehicle. The image sensor 201 may capture at least one image of an interior of the vehicle. The image may comprise at least one occupant on at least one seat of the vehicle. The at least one occupant may be a human or an object or an animal. The image sensor 201 may comprise at least one camera located at appropriate location(s), known to a person skilled in the art, inside the vehicle to capture at least one image of an interior of the vehicle. In a non-limiting example, the image sensor 201 may comprise at least one camera installed at the inner roof of the vehicle to capture at least one image of at least one rear seat of the vehicle. In this example, the at least one image may comprise at least one occupant on at least one rear seat of the vehicle.

In an embodiment of the present disclosure, the at least one weight sensor 203 may be arranged in a respective seat of the vehicle. The weight sensor 203 may detect a weight value of the occupant on the respective seat of the vehicle. In a non-limiting example, the weight sensor 203 may comprise a hydro static weight sensor. The weight sensor 203 may comprise any appropriate sensor capable of detecting weight, that is, known to a person skilled in the art.

In another embodiment of the present disclosure, the first processor 207 may be operatively coupled to the at least one image sensor 201. The first processor 207 may be configured to receive at least one image from the at least one image sensor 201 and process the received at least one image to determine whether the occupant is a human or an object or an animal. In an example, the image sensor 201 may be activated to capture one or more images of an interior of the vehicle in response to the ignition of the vehicle being turned ON. In another example, the image sensor 201 may be activated to capture one or more images of an interior of the vehicle in response to the ignition of the vehicle being turned ON and closing action of door of the vehicle. In a non-limiting example, the image sensor 201 may be activated to capture one or more images of an interior of the vehicle in response to the ignition of the vehicle being turned ON and closing action of rear door of the vehicle.

The first processor 207 may be trained to differentiate between different types of occupants. For example, the first processor 207 may be trained to classify the occupant as a human or an object or an animal by processing the at least one image received from the at least one image sensor 201. In another embodiment, the first processor 207 may be trained using a plurality of images of different types of occupants. In an example, the training images may be images of a human sitting on the seat, images of a human inclined/relaxing on the seat, images of a human sleeping on the seat, images of a human sitting on the seat holding an object or animal, etc. In another example, the training images may be images of various types of objects that can be accommodated in the vehicle. In yet another example, the training images may be images of animals that can be accommodated in the vehicle. In a further example of this embodiment, the training images may be images of humans and objects or humans and animals or objects and animals or humans and objects and animals. In this embodiment, the first processor 207 may be trained using images of rears seats of the vehicle to classify the occupants on the rear seats of the vehicle. Based on the training, the first processor 207 may determine whether the occupant is a human or an object or an animal.

In this embodiment of the present disclosure, the first processor 207 may be configured to receive the at least one image from the at least one image sensor 201. The first processor 207 may then be configured to process the received at least image to determine whether the occupant is a human or an object or an animal.

In this embodiment of the present disclosure, the first processor 207 may be operatively coupled to the at least one image sensor 201 and the second processor 209. The first processor 207 may be configured to receive the at least one image from the at least one image sensor 201. If the classification of the occupant indicates only the object or only the animal or a combination of the object and the animal, the first processor 207 may be configured to not take any action and terminate the process. On the other hand, if the classification of the occupant is the human, the first processor 207 may be configured to process the received at least one image for determining at least one parameter of the human. In this embodiment of the present disclosure, the first processor 207 is an electronic control unit that may comprise a partial network (PN) transceiver.

In this embodiment of the present disclosure, the at least one parameter of the human may comprise the age of the human and the height of the human. To determine the age of the human, the first processor 207 may be configured to detect a face of the human in the at least one image. In response to the detection of the face of the human in the at least one image, the first processor 207 may calculate a distance between left eye pupil and right eye pupil in each of the detected face to determine the age of the human based on the calculated distance in the corresponding detected face. The distance between left eye pupil and right eye pupil may be mapped to a respective age value in a memory of the first processor 207. The mapping of distance between left eye pupil and right eye pupil with age value may vary based on the geographical region, where the vehicle is being driven.

In this embodiment of the present disclosure, to determine the age of the human, the first processor 207 may also be configured to detect a face of the human in the at least one image. In response to detection of the face of the human in the at least one image, the first processor 207 may be configured to calculate a nose length in each of the detected face to determine the age of the human based on the calculated nose length in the corresponding detected face. The nose length may be mapped to a respective age value in a memory of the first processor 207. The mapping of calculated nose length with the age value may vary based on the geographical region, where the vehicle is being driven. It is to be noted that the present disclosure is not limited to the above defined techniques of age determination. In one non-limiting embodiment of the present disclosure, corners and edges of the eyes, lips and nostrils may be features used for mapping. However, determination of age through these features is purely dependent on the image processing technique used. Any other age determination method which uses image processing technique is well within the scope of the present disclosure.

In this embodiment of the present disclosure, the height of the human may be determined in the following manner. If the image indicates the human in a sitting position, the first processor 207 may be configured to determine the height of the human based on at least one reference parameter. The reference parameter may comprise a height of a back rest of the seat of the vehicle. As shown in FIG. 3(b), the height of a back rest of the seat of the vehicle may be denoted by $H_r$. If the at least one image indicates the human in a sleeping position, the reference parameter may comprise a horizontal distance between doors of the vehicle. As shown in FIG. 3(a), the horizontal distance between front and rear doors of the vehicle may be denoted by D1 and D2, respectively.

In an embodiment of the present disclosure, a height of the back rest of the seat of the vehicle and coordinates of the back rest of the seat of the vehicle are stored in the memory. When the human is in sitting position, the first processor 207 is configured to determine the coordinates of the waist and head of the human from the at least one image and compare the determined coordinates of the waist and head with the coordinates of the back rest of the seat of the vehicle to calculate the height of the human. In another embodiment of the present disclosure, the horizontal distance between front and rear doors of the vehicle and coordinates of the doors are stored in the memory. When the human is in sleeping position, the first processor 207 is configured to determine the coordinates of the waist and head of the human from the at least one image and compare the determined coordinates of the waist and head with the coordinates of the respective doors to calculate the height of the human. It is to be noted that the present disclosure is not limited to the above defined techniques of height determination. Any other height determination method which uses image processing technique is well within the scope of the present disclosure.

In this same embodiment of the present disclosure, the first processor 207 may be configured to transmit the at least one parameter to the second processor 209. The second processor 209 may be an electronic control unit that may comprise a partial network (PN) transceiver. The second processor 209 is activated in response to receipt of the at least one parameter from the first processor 207. The second processor 209 may be communication with the at least one weight sensor 203 and at least one lock 213. The second processor 209 may be further configured to receive the at least one weight value from the at least one weight sensor 203.

In this embodiment of the present disclosure, the second processor 209 may be configured to activate the at least one lock 213 based on the at least one parameter, or based on the at least one weight value and at the at least one parameter. The at least one parameter and the at least one weight value may be used to determine a presence of a child inside the vehicle. For example, if the occupant comprises only the human, the second processor 209 may be configured to detect a presence of the child in response to either one of the age of the human being less than the first threshold, or the height of the human being less than the second threshold and the detected weight value of the corresponding human being less than the third threshold. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold and the detected weight value of the corresponding human is less than the third threshold. The second processor 209 may be configured to activate the at least one lock 213 if the child is detected.

In this embodiment of the present disclosure, if the occupant comprises the human and the object, the second processor 209 may be configured to detect a presence of a child in response to either one of the age of the human being less than the first threshold, or the height of the human being less than the second threshold. In such cases, where the human is detected along with the object, the detected weight value is ignored, as the detected weight value may become greater than the third threshold due to the weight of the object. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold.

Similarly, if the occupant comprises the human and the animal, the second processor 209 may be configured to detect a presence of a child in response to either one of the age of the human being less than the first threshold, or the height of the human being less than the second threshold. In a scenario where the human is detected along with the animal, the detected weight value is ignored, as the detected weight value may become greater than the third threshold due to the weight of the animal. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold. The second processor 209 may be configured to activate the at least one lock 213 if the child is detected.

In this embodiment of the present disclosure, if the occupant comprises the human, the animal, and the object, the second processor 209 may be configured to detect a presence of a child in response to either one of the age of the human being less than the first threshold, or the height of the human is less than the second threshold. In a scenario where a human is detected along with the object and the animal, the detected weight value is ignored, as the detected weight value may become greater than the third threshold due to the weight of the object and the animal. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold. The second processor 209 may be configured to activate the at least one lock 213 if the child is detected.

In this embodiment of the present disclosure, the first threshold may be selected by the user of the vehicle. The second threshold and the third threshold may vary based on the various geographical regions of the world, where the vehicle is being driven. In another embodiment of the present disclosure, the first threshold, second threshold and the third threshold may be varied as per selection by the user of the vehicle. In one non-limiting embodiment of the present disclosure, the first threshold may be 3 years, the second threshold may be 88.9 centimeters, and the third threshold may be 11.8 kilograms for India.

In this embodiment of the present disclosure, the automatic door lock system 200 may also comprise a human-machine interface (HMI) 211 operatively coupled to the second processor 209 and configured to receive an HMI input from a user/driver of the vehicle. The second processor 209 may be configured to activate/deactivate the at least one lock 213 based on the HMI input. The HMI may be used by the user to manually activate or deactivate the at least one lock 213 of the vehicle.

FIG. 3(*a*) illustrates a top interior view of a vehicle, in accordance with an embodiment of the present disclosure. The distance between the front doors of the vehicle 300 may be indicated by a distance D1. The distance between the rear doors of the vehicle 300 may be indicated by a distance D2. The distances D1 and D2 may be used as reference parameters for calculating the height of the occupant present inside the vehicle, when the occupant is in the sleeping state.

FIG. 3(*b*) illustrates an occupant seat of a vehicle 300, in accordance with an embodiment of the present disclosure. The height of the back rest of the occupant may be denoted by height $H_r$. The height $H_r$ may be used as reference parameters for calculating the height of the occupant present inside the vehicle, when the occupant is in the sitting state.

Figure 4:
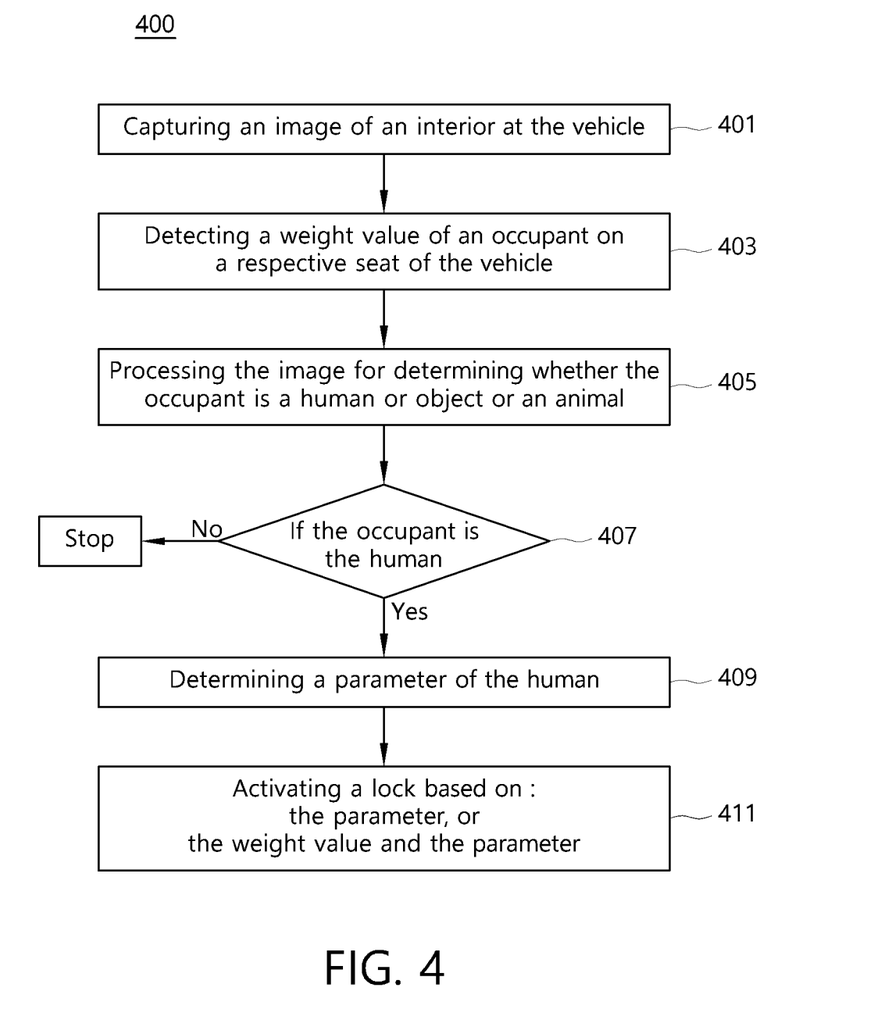
FIG. 4 illustrates a flowchart of an exemplary method for activating a lock in a vehicle, according to an embodiment of the present invention.

FIG. 4 illustrates a flowchart of an exemplary method 400 for activating a lock in a vehicle, according to an embodiment of the present invention.

In this embodiment of the present disclosure, the method 400 for activating at least one lock in a vehicle is disclosed. At block 401, at least one image of an interior of the vehicle is captured. The image may comprise at least one occupant on at least one seat of the vehicle. The at least one image may be captured through at least one camera located at appropriate location(s), known to a person skilled in the art, inside the vehicle. In an example of this embodiment, the at least one image of an interior of the vehicle is captured in response to the ignition of the vehicle being turned ON. In another example of this embodiment, the at least one image of an interior of the vehicle is captured in response to the ignition of the vehicle being turned ON and closing action of door of the vehicle. In a non-limiting example of this embodiment, the at least one image of an interior of the vehicle is captured in response to the ignition of the vehicle being turned ON and closing action of rear door of the vehicle.

At block 403, a weight value of the at least one occupant on the respective seat of the vehicle detected using at least one weight sensor. The weight sensor is arranged in a respective seat of the vehicle. In a non-limiting example of this embodiment, the weight sensor 103 may comprise a hydro static weight sensor. The weight sensor 103 may comprise any other appropriate sensor capable of detecting weight, that is, known to a person skilled in the art.

At block 405, the at least one image is processed to determine whether the occupant is a human or an object or an animal using a processor 107. The processor 107 may be trained to differentiate between different types of occupants as discussed above.

At block 407, the occupant is checked to determine that the occupant comprises the human. If the occupant is not the human i.e. only the object or only the animal or a combination of the object and the animal, then the method terminated. If the occupant is the human, at block 409, at least one parameter of the human is determined. The at least one parameter of the human comprises an age and a height. The age and the height of the human may be determined by using a processor as discussed above. The processor may be a processor 107 as shown in FIG. 1.

At block 411 of the method 400, at least one lock of the vehicle is activated based on the at least one parameter, or the at least one weight value and at the at least one parameter. The at least one parameter and the at least one weight value may be used to determine a presence of a child inside the vehicle. For example, if the occupant comprises only the human, a presence of the child is detected in response to either one of the age of the human being less than a first threshold, or the height of the human being less than a second threshold and the detected weight value of the corresponding human being less than a third threshold. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold and the detected weight value of the corresponding human is less than the third threshold. The at least one lock may be activated if the child is detected.

In the same embodiment of the present disclosure, if the occupant comprises the human and the object, a presence of a child is detected in response to either one of the age of the human being less than the first threshold, or the height of the human being less than the second threshold. In such cases, where the human is detected along with the object, the detected weight value is ignored, as the detected weight value may become greater than the third threshold due to the weight of the object. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold.

Similarly, if the occupant comprises the human and the animal, a presence of a child is detected in response to either one of the age of the human being less than the first threshold, or the height of the human being less than the second threshold. In a scenario where a human is detected along with the animal, the detected weight value is ignored, as the detected weight value may become greater than the third threshold due to the weight of the animal. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold. The at least one lock may be activated if the child is detected.

In this embodiment of the present disclosure, if the occupant comprises the human, the animal, and the object, a presence of a child is detected in response to either one of the age of the human being less than the first threshold, or the height of the human is less than the second threshold. In a scenario where a human is detected along with the object and the animal, the detected weight value is ignored, as the detected weight value may become greater than the third threshold due to the weight of the object and the animal. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold. The at least one lock may be activated if the child is detected.

In this embodiment of the present disclosure, the first threshold may be selected by the user of the vehicle. The second threshold and the third threshold may vary based on the various geographical regions of the world, where the vehicle is being driven. In another embodiment of the present disclosure, the first threshold, second threshold and the third threshold may be varied as per selection by the user of the vehicle. In one non-limiting embodiment of the present disclosure, the first threshold may be 3 years, the second threshold may be 88.9 centimeters, and the third threshold may be 11.8 kilograms for India.

In an embodiment of the present disclosure, the method 400 further comprise receiving a human-machine interface (HMI) input via an HMI interface and activating/deactivating the at least one lock based on the HMI input. The HMI may be used by the user to manually activate or deactivate the at least one lock of the vehicle. The steps of method 400 may be performed in an order different from the order described above.

Figure 5:
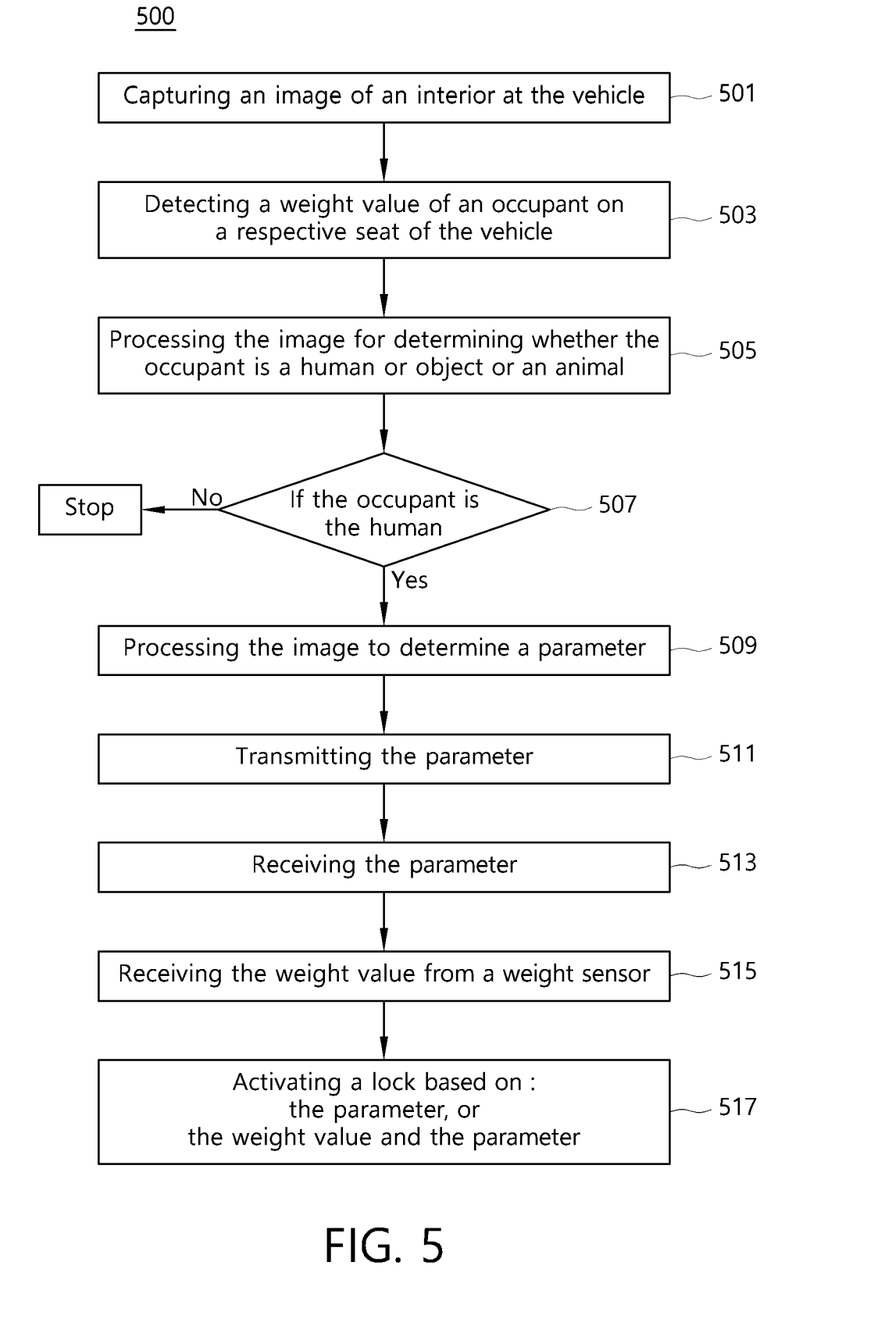
FIG. 5 illustrates a flowchart of an exemplary method for activating a lock in a vehicle, according to another embodiment of the present invention.

FIG. 5 illustrates a flowchart of an exemplary method for activating a lock in a vehicle, according to an embodiment of the present invention.

In one embodiment of the present disclosure, the method 500 for activating at least one lock in a vehicle using partial networking is disclosed. At block 501, at least one image of an interior of the vehicle is captured. The image may comprise at least one occupant on at least one seat of the vehicle. The at least one image may be captured through at least one camera located at appropriate location(s), known to a person skilled in the art, inside the vehicle. In an example of this embodiment, the at least one image of an interior of the vehicle is captured in response to the ignition of the vehicle being turned ON. In another example of this embodiment, the at least one image of an interior of the vehicle is captured in response to the ignition of the vehicle being turned ON and closing action of door of the vehicle. In a non-limiting example of this embodiment, the at least one image of an interior of the vehicle is captured in response to the ignition of the vehicle being turned ON and closing action of rear door of the vehicle.

At block 503, a weight value of the at least one occupant on the respective seat of the vehicle detected using at least one weight sensor. The weight sensor is arranged in a respective seat of the vehicle. In a non-limiting example of this embodiment, the weight sensor 203 may comprise a hydro static weight sensor. The weight sensor 203 may comprise any other appropriate sensor capable of detecting weight, that is, known to a person skilled in the art.

At block 505, the at least one image is processed to determine whether the occupant is a human or an object or an animal using a processor. The processor may be trained to differentiate between different types of occupants as discussed above. A first processor may be a first processor 207 as shown in FIG. 2.

At block 507 the occupant is checked to determine that the occupant comprises the human. If the occupant is not the human i.e. only the object or only the animal or a combination of the object and the animal, then the method terminated. If the occupant is the human, at block 509, at least one parameter of the human is determined. The at least one parameter of the human comprises an age and a height. The age and the height of the human may be determined by using a first processor as discussed above. The first processor may be a first processor 207 as shown in FIG. 2. In an embodiment of the present disclosure, the first processor 207 is an electronic control unit that may comprise a partial network (PN) transceiver.

At block 511, the at least one parameter of the human is transmitted to a second processor. The second processor may be a second processor 209 as shown in FIG. 2. At block 513, the at least one parameter of the human is received by the second processor. The second processor is an electronic control unit that may comprise a partial network (PN) transceiver. The second processor is activated only on receiving the at least one parameter of the human from the first processor.

At block 515, a weight value of the respective occupant is received by the second processor. At block 517, at least one lock of the vehicle is activated by the second processor based on the at least one parameter, or the at least one weight value and at the at least one parameter. The at least one parameter and the at least one weight value may be used to determine a presence of a child inside the vehicle. For example, if the occupant comprises only the human, a presence of the child is detected in response to either one of the age of the human being less than the first threshold, or the height of the human being less than the second threshold and the detected weight value of the corresponding human being less than the third threshold. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold and the detected weight value of the corresponding human is less than the third threshold. The at least one lock may be activated if the child is detected.

In the same embodiment of the present disclosure, if the occupant comprises the human and the object, a presence of a child is detected in response to either one of the age of the human being less than the first threshold, or the height of the human being less than the second threshold. In such cases, where the human is detected along with the object, the detected weight value is ignored, as the detected weight value may become greater than the third threshold due to the weight of the object. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold.

Similarly, if the occupant comprises the human and the animal, a presence of a child is detected in response to either one of the age of the human being less than the first threshold, or the height of the human being less than the second threshold. In a scenario where the human is detected along with the animal, the detected weight value is ignored, as the detected weight value may become greater than the third threshold due to the weight of the animal. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold. The at least one lock may be activated if the child is detected.

In this embodiment of the present disclosure, if the occupant comprises the human, the animal, and the object, a presence of a child is detected in response to either one of the age of the human being less than the first threshold, or the height of the human is less than the second threshold. In a scenario where the human is detected along with the object and the animal, the detected weight value is ignored, as the detected weight value may become greater than the third threshold due to the weight of the object and the animal. It is to be noted that in some scenarios, age detection may not be possible. For example, if the child is wearing cap or glasses, it may be difficult to detect the face and thus the distance between pupils or nose length. In such cases, child detection is confirmed if the height of the child is less than the second threshold. The at least one lock may be activated if the child is detected.

In this embodiment of the present disclosure, the first threshold may be selected by the user of the vehicle. The second threshold and the third threshold may vary based on the various geographical regions of the world, where the vehicle is being driven. In another embodiment of the present disclosure, the first threshold, second threshold and the third threshold may be varied as per selection by the user of the vehicle. In one non-limiting embodiment of the present disclosure, the first threshold may be 3 years, the second threshold may be 88.9 centimeters, and the third threshold may be 11.8 kilograms for India.

In an embodiment of the present disclosure, the method 500 further comprises receiving a human-machine interface (HMI) input via an HMI interface and activating/deactivating the at least one lock based on the HMI input. The HMI may be used by the user to manually activate or deactivate the at least one lock of the vehicle. The steps of method 500 may be performed in an order different from the order described above.

The HMI 109, 211 may include at least one of a key input means, such as a keyboard or keypad, a touch input means, such as a touch sensor or touchpad, a sound source input means, a camera, or various sensors, and the HMI 109, 211 may include a gesture input means. Further, the HMI 109, 211 may include all types of input means that are being currently in development or are to be developed in the future. The HMI 109, 211 may receive information from the user through the touch panel of the display and transfer the inputted information to the processor 107 and the second processor 209.

The processor 107, the first processor 207, second processor 209 may comprise one or more processors, memory, and a communication interface. The communication interface may comprise a partial network (PN) transceiver. In another embodiment of the present disclosure, the processor 107, the first processor 207, the second processor 209 may comprise an electronic control unit (ECU). The ECU may comprise one or more processors, memory, and a communication interface. The communication interface may comprise a partial network (PN) transceiver.

The memory of the processor 107 and the second processor 209 may maintain software maintained and/or organized in loadable code segments, modules, applications, programs, etc., which may be referred to herein as software modules. Each of the software modules may include instructions and data that, when installed or loaded on a processor and executed by the processor, contribute to a run-time image that controls the operation of the processors. When executed, certain instructions may cause the processor to perform functions in accordance with certain methods, algorithms and processes described herein.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. An automatic door lock system, comprising:
    a lock;
    an image sensor configured to capture an image of an interior of a vehicle, the image comprising an occupant on a seat of the vehicle;
    a weight sensor, wherein the weight sensor is arranged in a respective seat of the vehicle and configured to detect a weight value of the occupant on the respective seat of the vehicle; and
    a processor operatively coupled to the image sensor, the weight sensor and the lock and configured to:
        receive the image;
        process the image to determine an occupant type of the occupant by classifying the occupant into one of a plurality of occupant types, the plurality of occupant types including a first occupant type being only a human, a second occupant type being a human with an object, a third occupant type being a human with an animal, a fourth occupant type being a human with an object and an animal, and a fifth occupant type being an object or an animal without a human;
        in response to the determination that the determined occupant type is one of the first, second, third and fourth occupant types:
        receive the weight value from the weight sensor;
        process the received image to determine a parameter of the human; and
        activate the lock based on:
            the weight value and the parameter if the determined occupant type is the first occupant type; and
            the parameter without the weight if the determined occupant type is the second, third, or fourth occupant type.

2. The automatic door lock system of claim 1, wherein the parameter of the human is selected from a group comprising an age and a height.

3. The automatic door lock system of claim 2, wherein:
    if the determined occupant type is the first occupant type, the processor is configured to activate the lock in response to either one of:
        the age of the human is less than a first threshold; or
        the height of the human is less than a second threshold and the detected weight value of the corresponding human is less than a third threshold.

4. The automatic door lock system of claim 2, wherein to determine the age of the human, the processor is configured to:
    detect a face of the human in the image;
    in response to detection of the face of the human, calculate a distance between left eye pupil and right eye pupil in each of the detected face; and
    determine the age of the human based on the calculated distance in the corresponding detected face.

5. The automatic door lock system of claim 2, wherein to determine the age of the human, the processor is configured to:
    detect a face of the human in the image;
    in response to detection of the face of the human, calculate a nose length in each of the detected face; and
    determine the age of the human based on the calculated nose length in the corresponding detected face.

6. The automatic door lock system of claim 2, wherein to determine the height of the human, the processor is configured to:
    determine the height of the human based on a reference parameter, wherein said reference parameter comprises a height of a back rest of the seat or a horizontal distance between doors of the vehicle.

7. The automatic door lock system of claim 1, further comprising:
    a human-machine interface (HMI) operatively coupled to the processor and configured to receive an HMI input from a user, wherein in response to the HMI input, the processor is configured to activate/deactivate the lock.

8. A method for activating a lock in a vehicle, the method comprising:
    capturing an image of an interior of the vehicle, the image comprising an occupant on a seat of the vehicle;

detecting a weight value of the occupant on a respective seat of the vehicle;
processing the image for determining an occupant type of the occupant by classifying the occupant into one of a plurality of occupant types, the plurality of occupant types including a first occupant type being only a human, a second occupant type being a human with an object, a third occupant type being a human with an animal, a fourth occupant type being a human with an object and an animal, and a fifth occupant type being an object or an animal without a human;
in response to the determination that the determined occupant type is one of the first, second, third and fourth occupant types:
processing the image for determining a parameter of the human; and
activating a lock based on:
the parameter if the determined occupant type is the second, third, or fourth occupant type; and
the weight value and the parameter if the determined occupant type is the first occupant type.

9. The method of claim 8, wherein the parameter of the human is selected from a group comprising an age and a height.

10. The method of claim 9, wherein:
if the determined occupant type is the first occupant type, activating the lock comprises activating the lock in response to either one of:
the age of the human is less than a first threshold; or
the height of the human is less than a second threshold and the detected weight value of the corresponding human is less than a third threshold,
if the determined occupant type is one of the second, third, or fourth occupant types, activating the lock comprises activating the lock in response to either one of:
the age of the human is less than the first threshold; or
the height of the human is less than the second threshold.

11. The method of claim 9, wherein determining the age of the human comprises:
detecting a face of the human in the image;
in response to detecting of the face of the human, calculating a distance between left eye pupil and right eye pupil in each of the detected face; and
determining the age of the human based on the calculated distance in the corresponding detected face.

12. The method of claim 9, wherein determining the age of the human comprises:
detecting a face of the human;
in response to detecting the face of the human, calculating a nose length in each of the detected face; and
determining the age of the human based on the calculated nose length in the corresponding face.

13. The method of claim 9, wherein determining the height of the human comprises:
determining the height of the human based on a reference parameter, wherein said reference parameter comprises a height of a back rest of the seat or a horizontal distance between doors of the vehicle.

14. The method of claim 8, further comprising:
receiving a human-machine interface (HMI) input from a user; and
activating/deactivating the lock based on the HMI input.

15. A non-transitory computer-readable medium storing computer executable instructions when executed by a processor causes the processor to perform operations of:

capturing an image of an interior of the vehicle, the image comprising an occupant on a seat of the vehicle;
detecting a weight value of the occupant on a respective seat of the vehicle;
processing the image for determining an occupant type of the occupant by classifying the occupant into one of a plurality of occupant types, the plurality of occupant types including a first occupant type being only a human, a second occupant type being a human with an object, a third occupant type being a human with an animal, a fourth occupant type being a human with an object and an animal, and a fifth occupant type being an object or an animal without a human;
in response to the determination that the determined occupant type is one of the first, second, third and fourth occupant types:
processing the image for determining a parameter of the human; and
activating a lock based on:
the parameter if the determined occupant type is the second, third, or fourth occupant type; and
the weight value and the parameter if the determined occupant type is the first occupant type.

16. The non-transitory computer-readable medium of claim 15, wherein the parameter of the human is selected from a group comprising an age and a height.

17. The non-transitory computer-readable medium of claim 16, wherein:
if the determined occupant type is the first occupant type, the computer executable instructions further comprise instructions, which when executed by the processor causes the processor to perform operation of activating the lock in response to either one of:
the age of the human is less than a first threshold; or
the height of the human is less than a second threshold and the detected weight value of the corresponding human is less than a third threshold,
if the determined occupant type is one of the second, third, or fourth occupant types, the computer executable instructions further comprise instructions, which when executed by the processor causes the processor to perform operation of activating the lock in response to either one of:
the age of the human is less than the first threshold; or
the height of the human is less than the second threshold.

18. The non-transitory computer-readable medium of claim 16, wherein:
the computer executable instructions further comprise instructions, which when executed by the processor causes the processor to perform operations of:
detecting a face of the human in the image;
in response to detecting of the face of the human, calculating a distance between left eye pupil and right eye pupil in each of the detected face; and
determining the age of the human based on the calculated distance in the corresponding detected face, and
the computer executable instructions further comprise instructions, which when executed by the processor causes the processor to perform operations of:
determining the height of the human based on a reference parameter, wherein said reference parameter comprises a height of a back rest of the seat or a horizontal distance between doors of the vehicle.

19. The non-transitory computer-readable medium of claim 16, wherein:

the computer executable instructions further comprise instructions, which when executed by the processor causes the processor to perform operations of:
detecting a face of the human in the image;
in response to detecting the face of the human, calculating a nose length in each of the detected face; and
determining the age of the human based on the calculated nose length in the corresponding face, and
the computer executable instructions further comprise instructions, which when executed by the processor causes the processor to perform operations of:
determining the height of the human based on a reference parameter, wherein said reference parameter comprises a height of a back rest of the seat or a horizontal distance between doors of the vehicle.

* * * * *